United States Patent [19]

Stephenson

[11] Patent Number: 5,356,987

[45] Date of Patent: Oct. 18, 1994

[54] METHOD OF CURING A TOPCOAT

[75] Inventor: Maurice A. S. Stephenson, Philadelphia, Pa.

[73] Assignee: E. I. Du Pont de Nemours and Company, Wilmington, Del.

[21] Appl. No.: 989,047

[22] Filed: Dec. 11, 1992

Related U.S. Application Data

[62] Division of Ser. No. 699,345, May 13, 1991, Pat. No. 5,225,248.

[51] Int. Cl.$^5$ ............................................. C08L 29/02
[52] U.S. Cl. .................................... 524/512; 525/162
[58] Field of Search ......................... 525/162; 524/512

[56] References Cited

U.S. PATENT DOCUMENTS 4,497,150 2/1985 Dowbenko et al. ................ 428/447
4,591,533 5/1986 Antonelli et al. ................... 428/520

Primary Examiner—Ralph H. Dean
Attorney, Agent, or Firm—Chris P. Konkol

[57] ABSTRACT

In an improved method of curing a topcoat coating composition, at least a portion of the curing catalyst for the topcoat is contained in the basecoat composition. After applying the topcoat, the curing catalyst in the basecoat migrates to the topcoat, where it contributes to the curing the topcoat. Improved intercoat adhesion is obtained. In addition, the disclosed method enables the use of one package silane coating systems.

9 Claims, 2 Drawing Sheets

METHOD OF CURING A TOPCOAT

This is a division of application Ser. No. 07/699,345, filed May 13, 1991, now U.S. Pat. No. 5,225,248.

BACKGROUND OF THE INVENTION

This invention is directed to a method of coating a variety of substrates. In particular, this invention is directed to an improved method of curing a composition used as a coating, which method is especially useful for providing a finish for automobiles and trucks.

It is well known that consumers prefer automobiles and trucks with an exterior finish having an attractive aesthetic appearance, including high gloss and excellent DOI (distinctness of image). While ever more aesthetically attractive finishes have been obtained, deterioration of the finish over time, whereby the exterior finish of an automobile or truck loses its luster or other aspects of its aesthetic appearance, may be all the more noticeable. An increasingly observed cause of this deterioration is etching of the finish caused by exposure to environmental chemical attack. Chemicals that may cause etching of a finish include pollutants such as acid rain and chemical smog.

In order to protect and preserve the aesthetic qualities of the finish on a vehicle, it is generally known to provide a clear (unpigmented) topcoat over a colored (pigmented) basecoat, so that the basecoat remains unaffected even on prolonged exposure to the environment or weathering. It is also generally known that alkoxysilane polymers, due to strong silane bonding when cured, exhibit excellent chemical resistance. Exemplary of prior art patents disclosing silane polymers for coating are U.S. Pats. Nos. 4,368,297; 4,518,726; 4,043,953; and Japanese Kokai 57-12058.

However, to applicants' knowledge, none of the previously disclosed alkoxysilane compositions for finishing automobiles or trucks have as yet ever been placed into commercial use. It is believed that heretofore patented or known alkoxysilane coatings may suffer from certain unsolved problems or deficiencies. A significant problem with silane compositions has been the poor shelf life that the compositions exhibit when they contain curing catalysts. As a result, the pot life of a one package system is limited. Further, contamination with water or humidity may even cause premature gelling of the composition, which could render it unusable.

There is a need for a commercially practical finish having excellent appearance, including high gloss and DOI, that is resistant to etching caused by chemical attack. It is desirable that such a finish be readily obtained employing a composition that is not problematic, difficult to apply, unduly subject to premature gelling. It is desirable that such a composition have a good shelf life. It is further desirable that such a composition should be capable of being applied over a variety of basecoats and have excellent intercoat adhesion.

SUMMARY OF THE INVENTION

According to the present method, a silane-containing topcoat composition is applied over an essentially non-silane-containing basecoat. By the term "non-silane-containing" is meant that the film-forming polymers in the binder of the composition for the basecoat does not contain alkoxysilane, silanol, and/or acetoxysilane groups, or like reactive silicon-containing groups, the reaction of which causes curing. In the present method, a catalyst for curing the silane polymer in the topcoat is contained in the basecoat composition rather than, or in addition to, being contained in the topcoat composition being applied. When the topcoat is applied to the basecoat, at least a portion of the curing catalyst in the basecoat diffuses or migrates from the basecoat into the applied topcoat, where the diffusing catalyst provides curing. In addition, such curing may produce a coating having improved intercoat adhesion between the topcoat and the basecoat and improved through cure. More uniform curing may occur because the curing, to a greater extent, occurs from bottom to up. Such curing may result in better flow and leveling when the coating is applied, which in turn can effect modulus, toughness and appearance.

In operation, upon baking or curing of the basecoat and topcoat together, the curing catalyst effects crosslinking in the topcoat, either between silane groups on different molecules or between silane groups on the same molecule and other crosslinking groups on other polymers or crosslinking agents that may be present in the particular composition.

As indicated above, a cure catalyst for the silane topcoat can be either present in both the topcoat and basecoat composition or present in only the basecoat composition. A plurality or mixture of such cure catalysts can be employed and they can be different in the basecoat and topcoat compositons. In the case where the silane-containing topcoat composition, before application, contains no cure catalyst, the composition has vastly improved storage stability, since it will not gell without the presence of a cure catalyst. Yet, according to the present invention, it has been found that the topcoat will cure rapidly by means of catalyst contained in the basecoat, via migration of an effective amount of cure catalyst from the basecoat to the topcoat. The basecoat is not adversely affected by the inclusion therein of the curing catalyst for the topcoat because, in general, the polymers to be cross-linked in the basecoat, generally non-silane containing, are not catalyzed by the kind of catalyst, such as tin, which is employed to catalyze the silane-containing polymers in the topcoat. For example, if the basecoat consists of an alkylated melamine-formaldehyde resin, then strong acid catalysts, rather than the type of catalyst used to cure silane polymers, are typically used to cure the basecoat.

The present method is especially adaptable for use with one package systems for a topcoat composition. Typically, the term "one package" means a system in which the curing catalyst is already in, and stored with, the coating composition, but does not react until baking. In this case, however, the term "one package" means a system in which there is no curing catalyst in the coating composition, but that no such curing catalyst, conventionally in a second package, needs to be added to this composition before application. Hence, special measures or cumbersome precautions for stabilizing or preventing premature gelling of such compositions may be avoided. In addition, according to the present method, contamination of a silane composition by water or moisture would not cause the gelling that occurs with conventional silane compositions. Rather, the addition of certain quantities of water might even aid in eventual curing of a silane composition, when used according to the present method, by hydrolyzing the silanes to silanols. Small quantities of mineral alcohols or acids may also be added to facilitate the hydrolysis reaction.

The method of the present invention suitably employs conventional wet-on-wet techniques for applying a topcoat composition to a base coat. Since, according to such application, the topcoat is applied to the basecoat before the basecoat is fully dried or cured, the mobility of the cure catalyst into the topcoat is facilitated. The topcoat and basecoat are, to a substantial degree, cured and dried together. This simultaneous curing, as well as migratory effect of the catalyst, is believed to result in superior intercoat adhesion and other improved physical properties of the finish. This superior adhesion is a feature of the present invention regardless of whether additional curing catalyst is present in the topcoat.

According to the present method, coatings may be provided which are characterized by superior appearance to conventional siloxane coatings. They also possess good etch resistance. The method disclosed herein is especially useful for finishing the exterior of automobiles and trucks and other such substrates. The claimed method comprises the steps of:

(a) forming a basecoat by coating a substrate with one or more applications of a composition comprising (i) a film-forming binder and (ii) a catalyst for curing a film-forming polymer not contained in the basecoat composition and, before fully drying or curing of said basecoat has occurred, (b) coating said basecoat with one or more applications of a topcoat composition comprising said second film-forming polymer;

wherein, after steps (a) and (b), at least a portion of said curing catalyst diffuses, or otherwise migrates, from the basecoat to the topcoat where it causes or contributes to the curing and crosslinking of said film-forming polymer in the topcoat.

In a preferred embodiment, the film-forming polymer, in the topcoat, is an organosilane polymer comprising from about 30 to 95% by weight, based on the weight of the organosilane polymer, of ethylenically unsaturated monomers which do not contain a silane functionality and about 5 to 70% by weight ethylenically unsaturated monomers which contain a silane functionality. The claimed invention further includes a coated substrate prepared according to the above method.

The method of the present invention is especially useful for forming a clear topcoat over a pigmented basecoat. Such a clear topcoat can be applied over a variety of basecoats, such as basecoats containing water or organic solvent or powder basecoats.

DETAILED DESCRIPTION OF THE INVENTION

Figure 1:
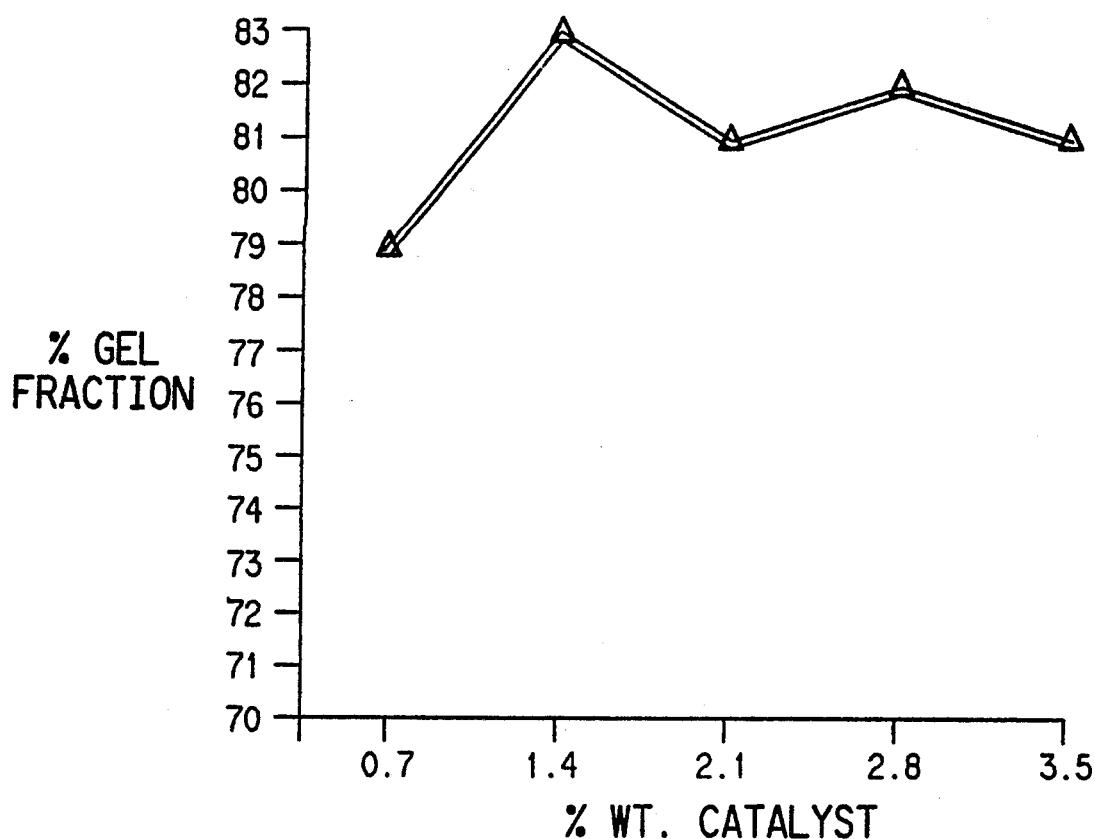
FIG. 1 is a graph showing the % gel fraction of a sample of a coating cured according to the present invention as described in Example 10 below.

This invention provides an improved method for applying a plurality of different coatings to a substrate. The method is especially useful for finishing the exterior of automobile and truck bodies and other such substrates. This method involves applying a basecoat, containing a curing catalyst for the topcoat, to a substrate, and thereafter applying the topcoat over the basecoat such that the curing catalyst in the basecoat is able to migrate into the topcoat to cure the same. In the case where no additional curing catalyst is present in the topcoat composition before its application, this method has the advantage of indefinitely preventing premature gelling of the topcoat composition in the pot. One package systems for silane coatings are thereby made possible. However, even if additional curing catalyst is present in the topcoat composition being applied, the present method is advantageous because the composition will have increased pot life and coatings may be formed having superior properties with regard to appearance, etch resistance, and/or intercoat adhesion.

The present method is capable of providing a coating which is durable, has excellent adhesion to basecoats, does not deteriorate in terms of transparency under prolonged exposure to weather conditions, and imparts a superior glossy appearance for an extended period. Also, the coating composition offers a significant improvement over convention coating compositions in terms of resistance to etching caused by environmental chemical attack.

The present method is particularly useful for coating automobiles or parts thereof, either for original manufacture, refinish, or maintenance which automobiles or parts thereof are typically cured at ambient or elevated temperatures. A typical automobile steel panel or substrate has several layers of coatings. The substrate is typically first coated with an inorganic rust-proofing zinc or iron phosphate layer over which is provided a primer which can be an electrocoated primer or a repair primer. A typical electrocoated primer typically comprises a cathodically deposited epoxy modified resin. A typical repair primer comprises an alkyd resin. Optionally, a primer surfacer can be applied over the primer coating to provide for better appearance and/or improved adhesion of the basecoat to the primer coat. A pigmented basecoat or colorcoat is next applied over the primer surfacer. A typical basecoat comprises a pigment, which may include metallic flakes in the case of a metallic finish, and polyester or acrylourethane as a film-forming binder. A clear topcoat (clearcoat) is then applied to the pigmented basecoat (colorcoat). The colorcoat and clearcoat are preferably deposited to have thicknesses of about 0.1–2.5 mils and 1.0–3.0 mils, respectively.

The film-forming portion of a topcoat composition employed according to the present invention comprises polymeric components and is referred to as the "binder" or "binder solids." It is typically dissolved, emulsified, or otherwise dispersed in an organic solvent or liquid carrier. The binder solids generally include all the normally solid polymeric non-liquid components of the composition. Generally, catalysts, pigments, and chemical additives such as stabilizers are not considered part of the binder. Non-binder solids other than pigments usually do not amount more than about 10% by weight of the composition applied. In this disclosure, the term binder includes organosilane polymers, dispersed polymers, polymeric polyols, and all other such film-forming polymers. The coating composition suitably contains about 50-75% by weight of the binder and about 25-50% by weight of an organic solvent carrier.

The broad concept of the invention is applicable to a variety of coating systems, including epoxy/anhydride, isocyanate/hydroxy, isocynate/amine, and other applicable systems. A preferred coating system comprises, as film-forming polymer, an organosilane polymer, herein also referred to as a silane polymer or siloxane polymer. The binder of the coating composition used in the method may contain about 10-90% by weight of a film-forming silane containing polymer. Suitable silane polymers have a weight average molecular weight of about 1000-30,000, a number average molecular weight of about 500-10,000. All molecular weights disclosed herein are determined by gel permeation chromatography using a polystyrene standard.

The present invention is applicable to a wide variety of organosilane polymers, including polyesters, polyester urethanes, acrylourethanes, copolymer and graft polymers thereof, and other polymers which contain curable silane groups. Examples of such other polymers are disclosed in copending commonly assigned application U.S. Ser. No. 699,344, filed May 13, 1991, now U.S. Pat. No. 5,182,174, hereby incorporated by reference.

A suitable silane polymer is the polymerization product of about 30-95% by weight ethylenically unsaturated non-silane containing monomers and about 5-70% by weight ethylenically unsaturated silane containing monomers, based on the weight of the organosilane polymer. Suitable ethylenically unsaturated non-silane containing monomers are alkyl acrylates, alkyl methacrylates and any mixtures thereof, where the alkyl groups have 1-12 carbon atoms, preferably 3-8 carbon atoms.

Suitable alkyl methacrylate monomers used to form an organosilane polymer are methyl methacrylate, ethyl methacrylate, propyl methacrylate, butyl methacrylate, isobutyl methacrylate, pentyl methacrylate, hexyl methacrylate, octyl methacrylate, nonyl methacrylate, lauryl methacrylate and the like. Similarly, suitable alkyl acrylate momomers include methyl acrylate, ethyl acrylate, propyl acrylate, butyl acrylate, isobutyl acrylate, pentyl acrylate, hexyl acrylate, octyl acrylate, nonyl acrylate, lauryl acrylate and the like. Cycloaliphatic methacrylates and acrylates also can be used, for example, such as trimethylcyclohexyl methacrylate, trimethylcyclohexyl acrylate, iso-butyl methacrylate, t-butyl cyclohexyl acrylate, or t-butyl cyclohexyl methacrylate. Aryl acrylate and aryl methacrylates also can be used, for example, such as benzyl acrylate and benzyl methacrylate. Of course, mixtures of the two or more of the above mentioned monomers are also suitable.

In addition to alkyl acrylates or methacrylates, other non-silane-containing polymerizable monomers, up to about 50% by weight of the polymer, can be used in an acrylosilane polymer for the purpose of achieving the desired physical properties such as hardness, appearance, mar resistance, and the like. Exemplary of such other monomers are styrene, methyl styrene, acrylamide, acrylonitrile, methacrylonitrile, and the like. Styrene can be used in the range of 0-50% by weight.

A suitable silane containing monomer useful in forming an acrylosilane polymer is an alkoxysilane having the following structural formula:

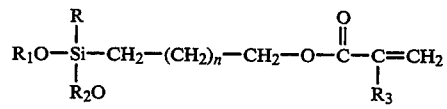

wherein R is either $CH_3$, $CH_3CH_2$, $CH_3O$, or $CH_3CH_2O$; $R_1$ and $R_2$ are $CH_3$ or $CH_3CH_2$; $R_3$ is either H, $CH_3$, or $CH_3CH_2$; and n is 0 or a positive integer from 1 to 10. Preferably, R is $CH_3O$ or $CH_3CH_2O$ and n is 1.

Typical examples of such alkoxysilanes are the acrylatoalkoxy silanes, such as gammaacryloxypropyltrimethoxy silane and the methacrylatoalkoxy silanes, such as gammamethacryloxypropyltrimethoxy silane, and gammamethacryloxypropyltris(2-methoxyethoxy) silane.

Other suitable alkoxy silane monomers have the following structural formula:

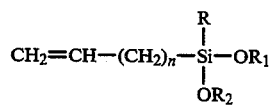

wherein R, $R_1$ and $R_2$ are as described above and n is a positive integer from 1 to 10.

Examples of such alkoxysilanes are the vinylalkoxy silanes, such as vinyltrimethoxy silane, vinyltriethoxy silane and vinyltris (2-methoxyethoxy) silane.

Other suitable silane containing monomers are acyloxysilanes, including acrylatoxy silane, methacrylatoxy silane and vinylacetoxy silanes, such as vinylmethyl diacetoxy silane, acrylatopropyl triacetoxy silane, and methacrylatopropyltriacetoxy silane. Of course, mixtures of the above-mentioned silane-containing monomers are also suitable.

Consistent with the above mentioned components of the silane polymer, an example of an organosilane polymer useful in the coating composition of this invention may contain the following constituents: about 15-25% by weight styrene, about 30-60% by weight methacryloxypropyltrimethoxy silane, and about 25-50% by weight trimethylcyclohexyl methacrylate.

One preferred acrylosilane polymer contains about 30% by weight styrene, about 50% by weight methacryloxypropyltrimethoxy silane, and about 20% by weight of nonfunctional acrylates or methacrylates such as trimethylcyclohexyl methacrylate, butyl acrylate, and iso-butyl methacrylate and any mixtures thereof.

Silane functional macromonomers also can be used in forming the silane polymer. These macromonomers are the reaction product of a silane containg compound, having a reactive group such as epoxide or isocyanate, with an ethylenically unsaturated non-silane containing monomer having a reactive group, typically a hydroxyl or an epoxide group, that is co-reactive with the silane monomer. An example of a useful macromonomer is the reaction product of a hydroxy functional ethylenically unsaturated monomer such as a hydroxyalkyl acrylate or methacrylate having 1-4 carbon atoms in the alkyl group and an isocyanatoalkyl alkoxysilane such as isocyanatopropyl triethoxysilane.

Typical of such above mentioned silane functional macromonomers are those having the following structural formula:

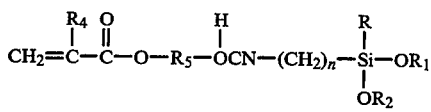

wherein R, $R_1$, and $R_2$ are as described above; $R_4$ is H or $CH_3$, $R_5$ is an alkylene group having 1-8 carbon atoms and n is a positive integer from 1-8.

Curing catalysts for catalyzing the crosslinking between silane moieties of a silane polymer and/or between silane moieties and other components of the composition include dibutyl tin dilaurate, dibutyl tin diacetate, dibutyl tin dichloride, dibutyl tin dibromide, triphenyl boron, tetraisopropyl titanate, triethanolamine titanate chelate, dibutyl tin dioxide, dibutyl tin dioctoate, tin octoate, aluminum titanate, aluminum chelates, zirconium chelate, and other such catalysts or mixtures thereof known to those skilled in the art. Tertiary amines and acids or combinations thereof are also useful for catayzing silane bonding which catalyst is added to the basecoat over which the silane-containing topcoat is applied. Preferably, these catalysts are typically used in the total amount of about 0.1 to 5.0% by weight, based on the weight of the binder in the basecoat or topcoat (the weight of the basecoat and topcoat binder is approximately equal). If the basecoat contains all of the curing catalyst for the topcoat, then a preferred amount, in the basecoat, is from about 2 to 3%, based on the weight of the topcoat or basecoat binder. If the catalyst is also contained in the topcoat as an adjunct, for example to promote intercoat adhesion, then a preferred amount is up to 0.1 to 1%, most preferably 0.2 to 0.6%, in the topcoat, based on the weight of the binder in the topcoat. When some cure catalyst is present in the topcoat, a suitable amount of water scavenger such as trimethyl orthoformate (preferably 2 to 6% by weight of binder) permits up to about 0.5% of cure catalyst in the topcoat while maintaining pot life.

In the typical case, the chemistry of the basecoat system is simple ether crosslink chemistry promoted by strong mineral acids, like sulfonic acids, for example. A tin catalyst or other catalyst, for curing a topcoat, has no effect on the basecoat curing. Curing of the basecoat, involving ether formation, is not promoted by tin, titanium or other Lewis acid catalysts used to cure the topcoat.

In the case of epoxy anhydride systems, a phosphonium or other conventional catalyst may be placed in the basecoat. In the case of an isocyanate system, a blocked or unblocked sulfonic acid catalyst may be placed in the basecoat.

Additional to an organosilane polymer, other film-forming and/or crosslinking polymers may be included in the topcoat compositon employed in the present application. Examples include conventionally known acrylics, cellulosics, aminoplasts, urethanes, polyesters, epoxides or mixtures thereof. One example of an additional optional acrylic polymer is an acrylic polyol solution polymer. Such polyols suitably has a hydroxyl number of about 50-200 and a weight average molecular weight of about 1,000-200,000 and preferably about 1,000-20,000.

In another embodiment, the coating composition employed as a topcoat in the present invention may include, particularly in conjunction with an optional polyol polymer, an additional crosslinking agent, for example a conventionally known monomeric or polymeric alkylated melamine formaldehyde resin that is partially or fully alkylated. One preferred crosslinking agent is a methylated and butylated or isobutylated melamine formaldehyde resin that has a degree of polymerization of about 1-3. Generally, this melamine formaldehyde resin contains about 50% butylated groups or isobutylated groups and 50% methylated groups. Such crosslinking agents typically have a number average molecular weight of about 300-600 and a weight average molecular weight of about 500-1500. Examples of commercially available resins are "Cymel" 1168, "Cymekl" 1161, "Cymel" 1158, "Resimine" 4514 and "Resimine" 354. Preferably, the crosslinking agent is used in the amount of about 5-50% by weight, based on the weight of the binder of the composition. Other crosslinking agents are urea formaldehyde, benzoquanamine formaldeyde and blocked polyisocyanates.

In addition to the above polymeric components, a dispersed polymer may be used in combination with an organosilane polymer. A polymer dispersed in an organic (substantially non-aqueous) medium has been variously referred to, in the art, as a non-aqueous dispersion (NAD) polymer, a microgel, a non-aqueous latex, or a polymer colloid. See generally, Poehlin et al., editor, SCIENCE AND TECHNOLOGY OF POLYMER COLLOIDS, Volume 1, pages 40-50 (1983); El-Asser, editor, FUTURE DIRECTIONS IN POLYMER COLLOIDS, pages 191-227 (1987); Barrett, DISPERSION POLYMERIZATION IN ORGANIC MEDIA (John Wiley 1975). See also U.S. Pat. Nos. 4,147,688; 4,180,489; 4,075,141; 4,415, 681; and 4,591,533, hereby incorporated by reference. Microgel particles, necessarily cross-linked, may also be used as rheology controllers for coatings, and in basecoats, to permit wet-on-wet application of paints.

In general, a dispersed polymer is characterized as a polymer particle dispersed in an organic media, which particle is stabilized by what is known as steric stabilization. According to the prior art, steric stabilization is accomplished by the attachment of a solvated polymeric or oligomeric layer at the particle-medium interface.

Suitable dispersed polymers for use in conjuction with silane polymers are disclosed in copending commonly assigned U.S. application Ser. No. 07/627,994, now U.S. Pat. No. 5,162,426, hereby incorporated by reference.

In general, the composition of the basecoat is not limited by the present invention except to the extent that it must not be adversely affected to a substantial degree, by the presence of the curing catalyst for the topcoat. Suitable basecoats include acrylic polyol/melamine or other standard basecoats. A variety of pigments and metallic flakes may be employed in the basecoat, as would be apparent to those skilled in the art. Typical pigments in the basecoat composition include the following: metallic oxides such as titanium dioxide, zinc oxide, iron oxides of various colors, carbon black, filler pigments such as talc, china clay, barytes, carbonates, silicates and a wide variety of organic colored pigments such as quinacridones, copper phthalocyanines, perylenes, azo pigments, indanthrone blues, carbazoles such as carbozole violet, isoindolinones, isoindolones, thioindigo reds, benzimidazolinones, metallic flake pigments such as aluminum flake and the like.

The pigments can be introduced into the coating composition by first forming a mill base or pigment dispersion with any of the aforementioned polymers used in the coating composition or with another compatable polymer or dispersant by conventional techniques, such as high speed mixing, sand grinding, ball milling, attritor grinding or two roll milling. The mill base is then blended with the other constituents used in the coating composition.

To improve weatherability of a clear finish produced by the present coating method, an ultraviolet light stabilizer or a combination of ultraviolet light stabilizers can be added in the amount of about 0.1–10% by weight, based on the weight of the binder. Such stabilizers include ultraviolet light absorbers, screeners, quenchers, and specific hindered amine light stabilizers. Also, an antioxidant can be added, in the about 0.1–5% by weight, based on the weight of the binder.

Typical ultraviolet light stabilizers that are useful include benzophenones, triazoles, triazines, benzoates, hindered amines and mixtures thereof. Specific examples of ultraviolet stabilizers are disclosed in U.S. Pat. No. 4,591,533, the entire disclosure of which is incorporated herein by reference.

The compositions employed in the present invention may also include other conventional formulation additives such as flow control agents, for example, such as Resiflow S (polybutylacrylate), BYK 320 and 325 (high molecular weight polyacrylates); rheology control agents, such as fumed silica; water scavengers such as tetrasilicate, trimethyl orthoformate, triethyl orthoformate and the like.

When a clearcoat (topcoat) is applied over a pigmented colorcoat (basecoat) to provide a colorcoat/clearcoat finish, small amounts of pigment can be added to the clear coat to eliminate undesirable color in the finish such as yellowing.

Conventional solvents and diluents are used to disperse and/or dilute the above mentioned polymers. Typical solvents and diluents include toluene, xylene, butyl acetate, acetone, methyl isobutyl ketone, methyl ethyl ketone, methanol, isopropanol, butanol, hexane, acetone, ethylene glycol, monoethyl ether, VM and P naptha, mineral spirits, heptane and other aliphatic, cycloaliphatic, aromatic hydrocarbons, esters, ethers and ketones and the like.

According to the present invention, a coating composition can be applied by conventional techniques such as spraying, electrostatic spraying, dipping, brushing, flowcoating and the like. The preferred techniques are spraying and electrostatic spraying. After application, a coating composition is typically baked at 100°–150° C. for about 15–30 minutes to form a coating about 0.1–3.0 mils thick. When a composition is used as a clearcoat, it is applied over the colorcoat which may be dried to a tack-free state and cured or preferably flash dried for a short period before the clearcoat is applied. The colorcoat/clearcoat finish may then be baked as mentioned above to provide a dried and cured finish.

It has become customary, particularly in the auto industry, to apply a clear topcoat over a basecoat by means of a "wet-on-wet" application, i.e., the topcoat is applied to the basecoat without curing or completely drying the basecoat. The coated substrate is then heated for a predetermined time period to allow simultaneous curing of the base and clear coats.

The following Examples illustrate the invention. All parts and percentages are on a weight basis unless otherwise indicated.

EXAMPLE 1

This example illustrates one embodiment of an organosilane polymer which may be employed in the present method. A solution of an organosilane polymer A is prepared by charging the following constituents into a polymerization reactor equipped with a heat source and a reflux condensor:

|  | Parts by Weight |
|---|---|
| Portion I |  |
| "Solvesso" 100 | 75.00 |
| Portion II |  |
| Methacryloxypropyltrimethoxy silane | 300.00 |
| Styrene monomer | 173.00 |
| Isobutyl methacrylate monomer | 103.86 |
| "Solvesso" 100 | 45.02 |
| Portion III |  |
| "Solvesso" 100 | 85.80 |
| Total | 840.00 |

The "Solvesso" 100 is a conventional aromatic hydrocarbon solvent. Portion I is charged into the reactor and heated to its reflux temperature. Portion II, containing the monomers for the organosilane polymer, and Portion III, containing the polymerization initiator, are each premixed and then added simultaneously to the reactor while the reaction mixture is held at its reflux temperature. Portion II is added at a uniform rate over a 6 hour period and Portion II is added at a uniform rate over a 7 hour period. After Portion II is added, the reaction mixture is held at its reflux temperature for an additional hour. The resulting acrylosilane polymer solution is cooled at room temperature and filtered.

The resulting acrylosilane polymer solution has a polymer solids content of about 70%, the polymer has a weight average molecular weight of about 3,000, and has the following constituents: 30% styrene, 18% isobutyl methacrylate, and 52% methacryloxypropyl trimethoxysilane.

EXAMPLE 2

A hydroxy functional non-aqueous sterically stabilized dispersed polymer, which may optionally be employed in the present process, is prepared by charging the following components into a reactor:

|  | Parts by Weight |
|---|---|
| Portion I |  |
| Isopropanol | 179.26 |
| Acrylic polymer solution (52% solids of an acrylic polymer of 15% styrene, 28% butyl methacrylate, 30% butyl acrylate, 10% hydroxy ethyl acrylate, 2% acrylic acid and 15% ethyl methacrylate having a weight average molecular weight of 10,000 in a solvent mixture of 82.2% xylene and 17.8% butanol) | 2254.05 |
| Mineral spirits | 255.65 |
| Heptane | 1912.46 |
| Portion II |  |
| Heptane | 28.75 |
| t-Butyl peroctoate | 4.68 |
| Portion III |  |

|  | Parts by Weight |
|---|---|
| Methyl methacrylate monomer | 1459.69 |
| Hydroxyethyl acrylate monomer | 784.81 |
| Styrene monomer | 156.97 |
| Portion IV | |
| Acrylic polymer solution (53% solids of an acrylic polymer of 15% styrene, 28% butyl methacrylate, 30% butyl acrylate, 10% hydroxy ethyl acrylate, 2% acrylic acid and 15% ethyl methacrylate, 2.7% glycidyl methacrylate having a weight average molecular weight of 10,000 in a solvent mixture of 82.2% xylene and 17.8% butanol) | 1126.52 |
| Methyl methacrylate monomer | 125.57 |
| Methyl acrylate monomer | 565.06 |
| Glycidyl methacrylate monomer | 47.05 |
| Heptane | 17.25 |
| Portion V | |
| Mineral Spirits | 638.63 |
| t-Butyl peroctoate | 47.14 |
| Isobutanol | 127.31 |
| Portion VI | |
| t-Butyl peroctoate | 30.96 |
| Isobutanol | 255.65 |
| Portion VII | |
| Heptane | 167.25 |
| Total | 10,184.71 |

Portion I is charged into the reaction vessel and heated to its reflux temperature. Then Portion II is added to the reaction vessel mixed and held at reflux temperature for 2 minutes. Then Portions III and IV are added simultaneously with Portion V, over a 210 minute period, to the reaction vessel while maintaining the resulting reaction mixture at its reflux temperature. Then the mixture is held at its reflux temperature for an additional 45 minutes. Portion VI is added over a 90 minute period while maintaining the reaction mixture at its reflux temperature and then held at this temperature for an additional 90 minutes. Portion VII is added and excess solvent is stripped off to give a 60% solids dispersion.

The resulting polyester dispersed polymer has a core having a weight average molecular weight of about 100,000–200,000 and arms attached to the core having a weight average molecular weight of about 10,000–15,000.

EXAMPLE 3

An acrylic polyol resin solution, which may additionally be employed in the present process, is prepared by charging the following constituents into a polymerization reactor equipped with a heat source and a reflux condenser:

|  | Parts by Weight |
|---|---|
| Portion I | |
| n-Pentyl propionate | 501.00 |
| Portion II | |
| Styrene | 360.00 |
| Isobutyl methacrylate | 696.00 |
| 2-Ethylhexyl acrylate | 480.00 |
| Hydroxypropyl acrylate | 864.00 |
| n-Pentylpropionate | 285.00 |
| Portion III | |
| t-Butyl peroctoate | 60.00 |
| n-Pentyl propionate | 60.00 |
| Total | 3306.00 |

Portion I is charged into the reactor and is heated to its reflux temperature of about (160°–163° C.). Portions II and III are each premixed and then added simultaneously to the reactor while the reaction mixture is held at its reflux temperature. Portion II is added at a uniform rate over a 6 hour period and Portion III is added at a uniform rate over a 7 hour period. After Portion III is added, the reaction mixture is held at its reflux temperature for an additional hour. The resulting acrylic polyol resin solution is cooled at room temperature and filtered.

The resulting acrylic polyol resin solution is 70% by weight of polymer solids. The polymer has a weight average molecular weight of about 6,000 and a hydroxyl number of about 150–160. It consitutes the following: 15% styrene, 29% isobutyl methacrylate, 20% 2-ethylhexyl methacrylate, and 36% hydroxypropyl acrylate.

EXAMPLE 4

One embodiment of a coating composition useful in practicing the present process is prepared by blending together the following constituents:

|  | Parts by Weight |
|---|---|
| Portion I | |
| Xylene | 163.00 |
| 2(3-hydroxy-3,5,-ditertamylphenyl amylphenyl) benzotriazole | 113.20 |
| Hindered amine U.V. light stabilizer solution (40% solution in xylene of 8-acetyl-3-dodecyl - 7, 7, 9, 9-tetramethyl-2, 3, 8-triazaspiro (4,5)-decane-2,4 dione) | 147.80 |
| Baysilon Oil Solution (72.8 parts Baysilone Fluid OL and 655.2 parts xylene) | 4.10 |
| Portion II | |
| Methylated/butylated melamine formaldehyde resin (fully butylated and methylated melamine formaldehyde resin having a butoxy/methoxy ratio of 1:1 and a degree of polymerization of about 1–1.2) | 2068.50 |
| Acrylic polyol resin solution | 4054.30 |
| Blocked sulfonic acid solution (33% solids in methanol of dodecyl benzene sulfonic acid blocked with dimethyl oxazolidine, molar ratio of acid: dimethyl oxazolidine is 1.52:1) | 236.40 |
| Dispersed polymer (prepared above) | 985.40 |
| Acrylosilane polymer solution A (prepared above) | 3439.00 |
| Portion III | |
| Methanol | 203.80 |
| "Solvesso" 100 - hydrocarbon solvent | 458.50 |
| Total | 11,874.00 |

The constituents of Portion I are added in the order shown to a mixing vessel and agitated until solution is complete. Portion II is added to the vessel and mixed for 30 minutes. Portion III is added and mixed for 30 minutes. The resulting clear coating composition has 70% solids content.

The resulting composition is sprayed onto primer coated phosphatized steel panels that were coated with a solvent base pigmented acrylic polymer basecoating composition containing 1.5% dibutyl tin dilaurate. The composition is sprayed onto the panels before the basecoating is baked. The panels are baked at 120° C. for 30 minutes and a clear coat about 2 mils thick is formed on each panel. The clear coating has a hardness and gloss which are essentially the same as when the catalyst is in the topcoat. The coating has excellent outdoor weatherability and resistance to environmental attack, good mar and scratch resistance, good humidity resistance as determined by the Cleveland Humidity test and good chip resistance as determined by a gravelometer test.

EXAMPLE 5

Another example of an acrylosilane polymer solution (B) is prepared by first forming a silane containg macromonomer and then reacting the macromonomer with acrylic monomers.

The macromonomer is prepared by charging the following constituents into a reactor equipped as above:

|  | Parts by Weight |
| --- | --- |
| Portion I |  |
| Y-9030 (isocyanatopropylmethoxy silane) | 750.0 |
| Xylene | 300.0 |
| Portion II |  |
| Hydroxyethyl acrylate monomer | 340.0 |
| Total | 1390.0 |

Portion I is heated to about 120° C. and Portion II is slowly added over a 1 hour period with constant mixing. The reaction mixture is held at the above temperature for about 1 hour and the isocyanate level is checked by infrared analysis. When the isocyanate level reaches zero, the reaction is stopped and the resulting macromonomer solution is cooled to room temperature.

Acrylosilane polymer solution B is prepared by charging the following constituents into a reactor as equipped above:

|  | Parts by Weight |
| --- | --- |
| Portion I |  |
| "Solvesso" 100 | 430.0 |
| Portion II |  |
| Macromonomer solution (prepared above) | 1826.0 |
| Styrene monomer | 765.0 |
| Methyl methacrylate monomer | 153.0 |
| Butyl methacrylate monomer | 153.0 |
| 2-Ethylhexyl methacrylate monomer | 153.0 |
| "Solvesso" 100 | 170.0 |
| Portion III |  |
| 2,2-(2 methyl butane nitrile) | 100.0 |
| "Solvesso" 100 | 300.0 |
| Total | 4050.0 |

Portion I is charged into the reactor and heated to its reflux temperature. Portions II and III are premixed and slowly added to the reactor while maintaining the reaction mixture at its reflux temperature. Portion II is a added over a 6 hour period and Portion III is added over a 7 hour period. The reaction mixture is held at its reflux temperature for an additional hour and then cooled to room temperature.

The resulting acrylosilane polymer solution has a polymer solids content of about 66%. The polymer has a weight average molecular weight of about 6,000, and has the following constituents: 53% macromonomer, 29% styrene, 6% methyl methacrylate, 6% butyl methacrylate, and 6% 2-ethylhexyl methacrylate.

EXAMPLE 6

Another example of an acrylosilane polymer solution (C) is prepared by cobalt special chain transfer (SCT) by charging the following constituents into a heated reactor flask of five liter volume fitted with a water cooled condensor, stirrer, 2 feed metering pumps and a thermometer:

|  | Parts by Weight |
| --- | --- |
| Portion I |  |
| "Solvesso" 100 | 120.00 |
| Ethylene Glycol Monobutyl Ether Acetate | 120.00 |
| Xylene | 150.00 |
| Portion II |  |
| gamma-methacryloxypropyltrimethoxy silane | 39.67 |
| Styrene | 28.33 |
| Isobutyl methacrylate | 45.33 |
| Co(DMG-BF$_2$)$_2$ | 0.05 |
| VAZO 67 | 2.74 |
| Portion III |  |
| gamma-methacryloxypropyltrimethoxy silane | 847.83 |
| Styrene | 605.42 |
| Isobutyl methacrylate | 968.67 |
| Portion IV |  |
| VAZO 67 | 17.25 |
| "Solvesso" | 100.00 |
| Ethylene glycol monobutyl ether acetate | 100.00 |
| Xylene | 100.00 |
| Portion V |  |
| t-Butyl Peroxyacetate | 10.00 |
| Xylene | 60.00 |

Portion I, containing organic solvents, is charged into the reactor flask and heated under a nitrogen atmosphere to its reflux temperature. Portion II, containing the acrylosilane monomers and an initiator (a cobalt chelate of dimethylglycol and boron difluoride), is added to the refluxing solvent over a 10 minute period. After the 10 minute period, Portion III, containing additional monomers, and Portion IV, containing additional solvent, are each premixed and then added simultaneously to the reactor while the reaction mixture is held at its reflux temperature. Portion III is added at a uniform rate over a period of 360 minutes and Portion IV is added at a uniform rate over a period of 390 minutes. Then, Portion V, containing an initiator to kill the cobalt chain transfer, is fed over a 20 minute period. After Portion V is added, the reaction mixture is held at its reflux temperature for an additional 30 minutes. The resulting acrylosilane polymer solution is cooled at room temperature and filtered. The polymer has a weight average molecular weight of about 10,000–12,000 and constitutes 29% styrene, 30% isobutyl methacrylate and 41% methacryloxypropyltrimethoxy silane.

EXAMPLE 7

Another example of an acrylosilane polymer solution (D) is prepared by a group transfer process (GTP) as follows. To a four neck 3 liter flask, fitted with a stirrer, condenser, two feed pumps, thermometer and nitrogen inlet is added 950 g toluene, 136 g methyl methacrylate, 106 g butyl methacrylate, 118 g trimethoxysilylpropyl methacrylate and 46.2 g trimethoxysilylpropyl dimethyl ketene. The reaction mixture is cooled to 5° C. and 4 ml of tetrabutyl ammonium m-chlorobenzoate catalyst is added over 90 minutes. The catalyst feed is temporarily interrupted during the reaction exotherm. When the exotherm subsides, the catalyst feed is resumed together with a monomer feed, over 40 minutes, of 220 g methyl methacrylate, 212 g butyl methacrylate and 237 g trimethoxysilylpropyl methacrylate. After completing all the addition, the reaction mixture is held for an additional half hour, after which 45 g methanol, for killing the ketene initiator, is added to the reaction mixture. The resulting polymer solution constitutes methyl methacrylate, 31% butyl methacrylate, and methacryloxypropyl trimethoxy silane.

EXAMPLE 8

The following components are used in preparing an acrylosilane solution polymer E by free radical polymerization.

| | Parts by Weight |
|---|---|
| Portion I | |
| "Solvesso" 100 | 726.4 g |
| Portion II | |
| Methacryloxypropyltrimethoxy silane | 1380.3 g |
| Styrene | 500. g |
| Methyl methacrylate monomer | 424.7 g |
| 2-Ethylhexyl acrylate | 159.2 g |
| Butyl methacrylate monomer | 159.2 g |
| Hydrocarbon ("Napoleum" 145A) | 81.8 g |
| Portion III | |
| "Lepensol" 70 | 70. g |
| Hydrocarbon ("Napoleum" 145A) | 199.3 g |
| Portion IV | |
| Hydrocarbon ("Napoleum" 145A) | 27.2 g |
| Portion V | |
| Hydrocarbon ("Napoleum" 145A) | 9.1 g |

Portion I, containing organic solvent, is charged to the reaction flask and heated to reflux. Portion II, containing the monomers for the acrylosilane polymer, and Portion III are added simultaneously. Portion II is added over a 6 hour period, and Portion III is added over a 7 hour period. After Portion II is added, Portion IV is added immediately. After Portion III is added, Portion V is added immediately. Heating is continued at reflux for one additional hour after all the portions have been added. The reaction mixture is then cooled and filtered.

EXAMPLE 9

An example of a polyester urethane solution, for use in the next example, may be prepared by charging the following constituents into a reaction vessel equipped with a stirrer, a heating source and a reflux condenser:

| | Parts by Weight |
|---|---|
| Portion 1 | |
| Water | 212.30 |
| Neopentyl glycol | 1910.60 |
| Portion 2 | |
| Trimethylol propane | 259.53 |
| Azelaic acid | 1454.24 |
| Dodecanedioic acid | 1779.12 |
| Portion 3 | |
| Toluene | 113.60 |
| Portion 4 | |
| Toluene | 190.55 |
| Aromatic hydrocarbon solvent | 886.00 |
| Portion 5 | |
| Neopentyl glycol | 394.03 |
| Stannous octoate | 0.85 |
| Portion 6 | |
| 2,3,5-trimethylhexamethylene diisocyanate | 1069.52 |
| Portion 7 | |
| Aromatic hydrocarbon solvent | 945.70 |
| Total | 9216.04 |

Portion 1 was charged into the reation vessel, the reaction vessel was purged with nitrogen, and the constituents of Portion 1 were heated to about 65°-70° C. The constituents of Portion 2 were charged into the vessel in the order shown, while the constituents in the vessel were maintained at the above temperature. The constituents then were heated to 120° C., and the resulting composition was refluxed to remove water as a polyester was formed. The temperature was gradually increased as water was removed until it reached about 240° C. Heating was continued until an acid number of the polyester was about 0–1.5. Portion 3 then was added. Heating was stopped and Portion 4 was added to cool the resulting compostion to about 120° C. Portion 5 was then added and the moisture content of the composition was determined by a Fisher method. If the moisture content was over 0.1%, the composition would be dried azeotropically for 30 minutes and the moisture content determined again. Portion 6 was added to the composition at a uniform rate over a 30 minute period without external heating. The composition was held at about 120°–145° C. for 30 minutes and a sample removed and tested for unreacted isocyanate by infrared analysis. If there was unreacted isocyanate in the composition, the composition would be held for a additional 30 minutes at the above temperature.

Portion 7 then was added and the resulting composition was allowed to cool to ambient temperatures.

The resulting composition had a polymer weight solids content of about 76%. The polyester urethane contained about 32% neopentyl glycol, 4% trimethylol propane, 22% azelaic acid, 26% dodecanedioic acid and 16% trimethylhexamethylene diisocyanate and had a Mw (weight average molecular weight) of 15,000 determined by GPC and had a hydroxyl number of about 80.

For curing the composition, a catalyst comprising a blocked aromatic sulfonic acid solution was prepared as follows:

| | Parts by Weight |
|---|---|
| Portion 1 | |
| Methanol | 267.26 |

-continued

|  | Parts by Weight |
|---|---|
| Aromatic sulfonic acid solution (70% solids of dodecyl benzene sulfonic acid in isopropanol) | 296.99 |
| Methanol | 36.35 |
| Oxazoline solution (76% 4,4-dimethyl-1-oxa-3-azacyclopentane, 2% 3,44-trimethyl-1-oxa-azocyclopentane in 22% water) | 91.05 |
| Portion 3 | |
| Metanol | 36.35 |
| Total | 728.00 |

Portion 1 was charged into a reaction vessel and then portion 2 was added and allowed to react and then portion 3 was added and the solution was cooled to an ambient temperature.

EXAMPLE 10

This example illustrates the use of a topcoat composition comprising a combination of a polyester urethane, melamine/formaldehyde resin, and an acrylosilane polymer. The following ingredients were mixed:

| polyester urethane | 42.63% |
|---|---|
| alkylated melamine/formaldehyde resin (crosslinker) | 30.23% |
| silane functonal acylic solution polymer | 27.14% |
| strong acid (block acid, curing catalyst) | 0.5% |
| ZW-8027 flow agent | 1.03% |
| Tinuvin 1130 light stabilizer | 0.33% |
| DS-1890 leveling agent | 0.25% |

The polyester urethane and the strong acid was prepared according to Example 9 above. The acrylosilane, in the above compositon, was 50% styrene, 35% 3-methacryloxypropyltrimethoxy silane (A-174) from Union Carbide, 5% methyl methacrylate, 5% butyl methacrylate, and 5% 2-ethylhydroxy acrylate. The flow agent, a tetramethyl orthoformate, the light stabilizer, a substituted hydroxyphenol bentotriazole, and the leveling agent, a silicone oil, are commercially available and conventional products. Solvent, ethylene glycol monobutyl ether, was employed to thin the composition to 35 secs. viscosity. The catalyst for curing the silane functionality is put into a basecoat system which is cured by melamine crosslinking chemistry. The level of tin catalyst used is 1.5% on binder. The following curing catalysts were evaluated:
(1) Dibutyl tin dilaurate
(2) Dibutyl tin diacetate
(3) Dibutyl tin dichloride and dibromide
(4) Triphenyl boron
(5) Tetraisopropyl titanate
(6) Triethanolamine titanate chelate
(7) Titanium quadrol complex
(8) Titanium, 2-ethyl-1,3-hexane chelate complex mono diol adduct
(9) Titanium, 2-ethyl-1,3-hexane chelate complex bis(diol) adduct, The topcoat (clearcoat in this case) compositions tested were sprayed onto basecoat coated steel panels and baked at 250° F. (120° C.) for 30 minutes to give the desired coatings. The clearcoat was applied to the basecoat "wet on wet", and both were cured at the same time. All of the above curing catalysts, when contained in the basecoat, succeeded in curing the topcoat applied over the basecoat, except the triethanolamine titanate chelate. The basecoat without any added catalyst does not cure the clearcoat.

The results with the dibutyl tin dilaurate curing catalyst were taken as representative. The hardened topcoat exhibited a gloss of 90, a DOI of 70, a hardness of 1.5 Knoop, and excellent flexibility. Studies of catalyst diffusion from the basecoat to the topcoat were carried out by scraping layers (first, second and third passes) from the cured topcoat to obtain samples and measuring the amount of tin in the samples by atomic absorption. The results are shown in Table 1 below and show that, based on about 10,000 ppm (1.5%) tin in the basecoat, about 70% of the tin succeeded in diffusing to the topcoat.

TABLE 1

| BASE-COAT | CATALYST LOCATION | 1ST PASS % SN FOUND | 2ND PASS % SN FOUND | 3RD PASS % SN FOUND |
|---|---|---|---|---|
| Black | Clearcoat | 1300 ppm | 1500 ppm | 3400 ppm |
| Black | Basecoat | 1240 ppm | 1460 ppm | 5500 ppm |
| White | Clearcoat | 1500 ppm | 1690 ppm | — |
| White | Basecoat | 2145 ppm | 2170 ppm | 2387 ppm |

Figure 2:
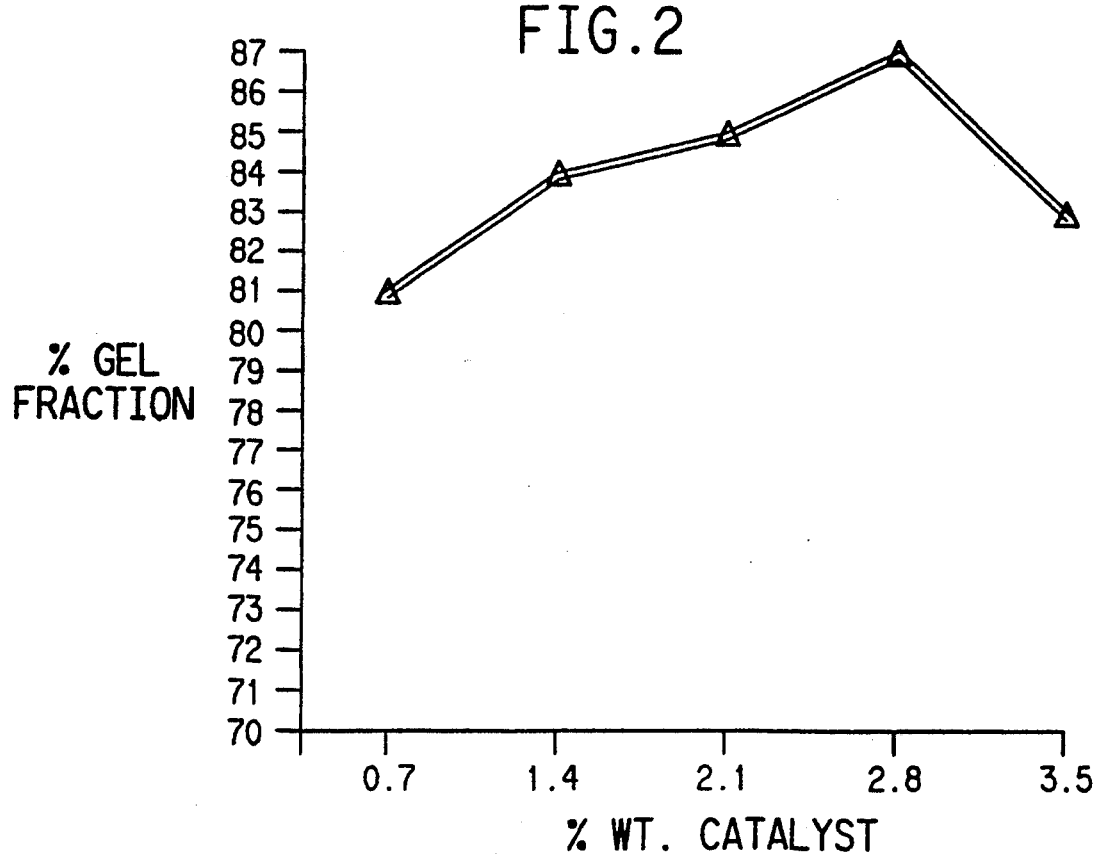
FIG. 2 is a graph showing the % gel fraction of a comparative (control) sample of a coating cured conventionally n as described in Example 10 below.
Figure 3:
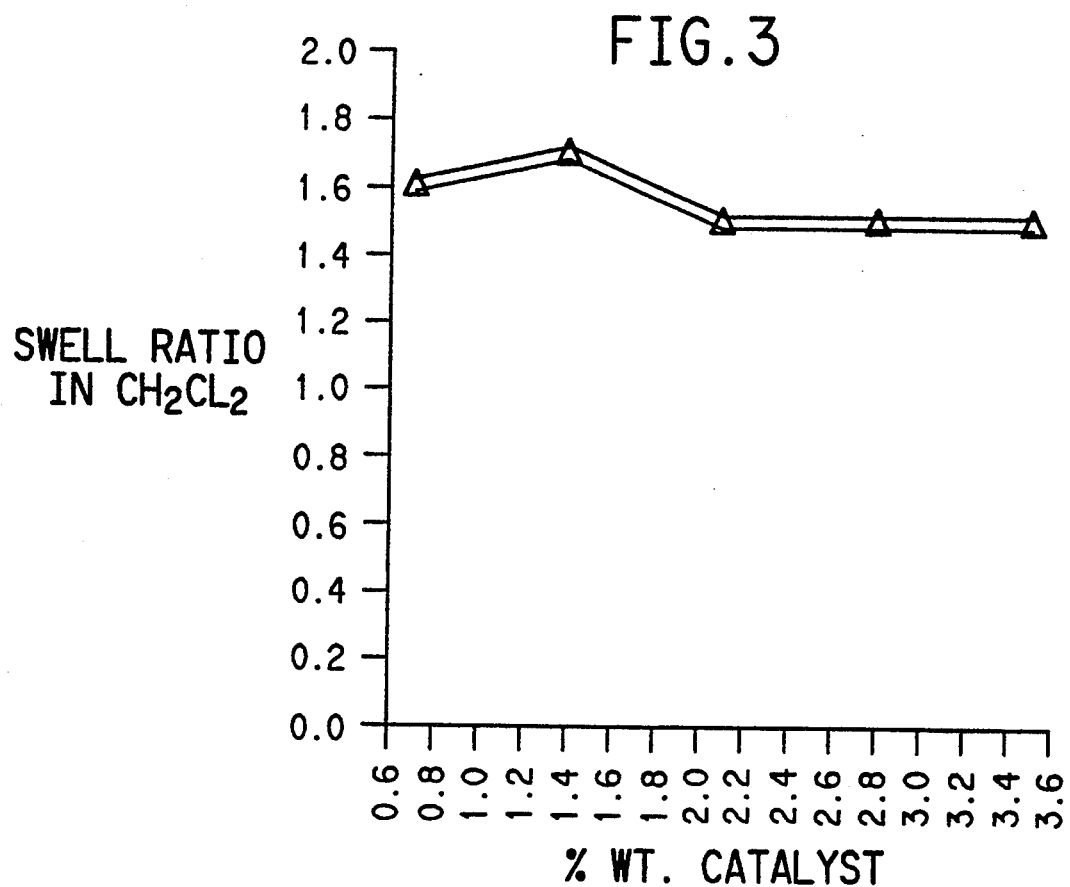
FIG. 3 is a graph showing the amount of swell ratio in $CH_2Cl_2$ of a sample of a coating cured according to the present invention as described in Example 10 below.
Figure 4:
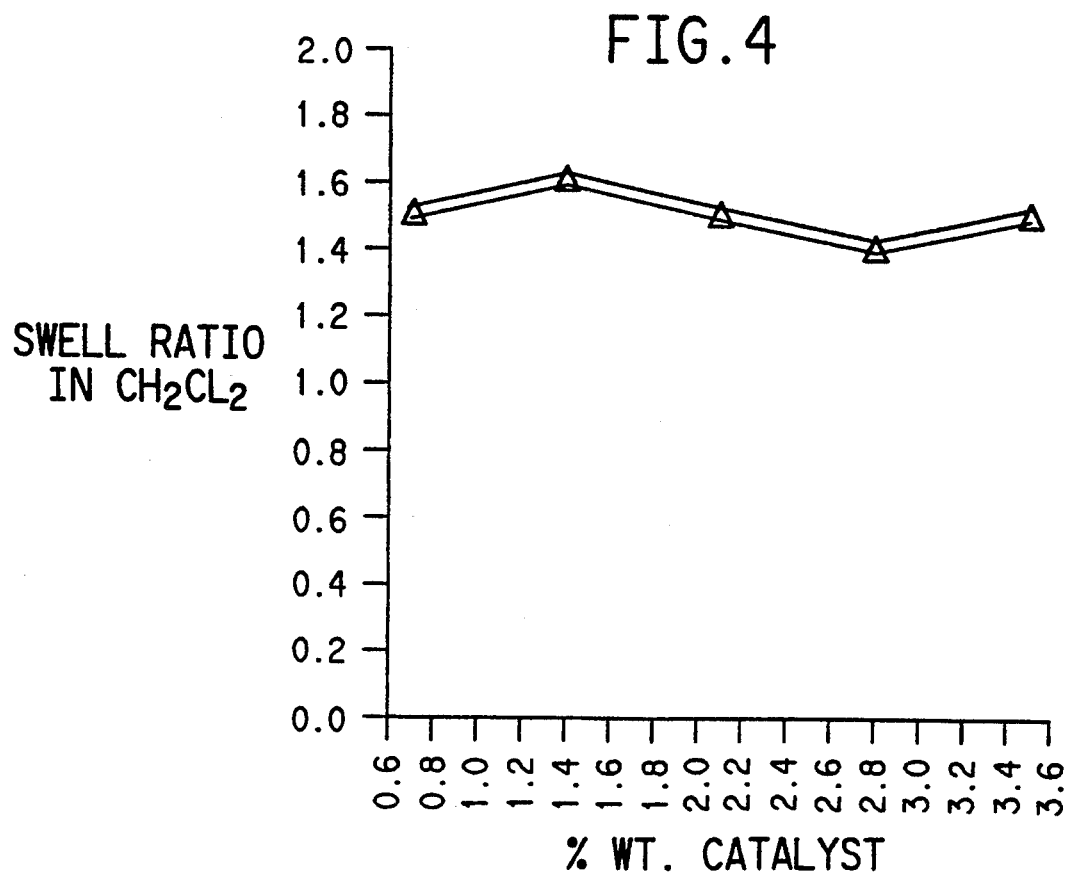
FIG. 4 is a graph showing the amount of swell ratio in $CH_2Cl_2$ of a comparative (control) sample of a coating cured conventionally as described in Example 10 below.

FIGS. 1 through 4 also show that the amount of cross-linking in the topcoat is about the same, whether the tin catalyst is placed in the topcoat (control) or in the basecoat according to the present invention. In FIGS. 1 and 2, the % gel fraction is shown and in FIGS. 3 and 4, the amount of swell ratio in $CH_2Cl_2$ is shown, as measured by standard procedures. Both measurements are indicative of how much cross-linking has occurred in the coating.

Various modifications, alterations, additions or substitutions o the process of this invention will be apparent to those skilled in the art without departing form the scope and spirit of this invention and it should be understood that this invention is not limited to the illustrated embodiments set forth herein, but rather as recited in the following claims.

I claim:

1. A basecoat composition comprising pigment and a non-silane containing film-forming binder, which basecoat composition comprises a curing catalyst for said non-silane containing film-forming binder and also at least one curing catalyst for a silane functional acrylic polymer in a clearcoat composition for use over the basecoat composition, which silane functional acrylic polymer is, however, not contained in the basecoat composition, and wherein said catalyst for said silane functional acrylic polymer is at least one organometallic curing catalyst which is present in the basecoat composition in the amount of from 0.1 to 5% by weight of the composition.

2. The composition of claim 1, wherein said catalyst for a silane functional acrylic polymer is present in the composition in the amount of 1 to 5%, by weight of the binder in the composition.

3. The composition of claim 1, wherein the non-silane containing film-forming binder comprises an acrylic polyol and a melamine crosslinking agent.

4. The composition of claim 3; wherein said curing catalyst for said non-silane containing film-forming binder is a strong acid catalyst.

5. The composition of claim 1, wherein said catalyst for said silane functional acrylic polymer comprises tin, aluminum, titanium, or zirconium.

6. The composition of claim 5, wherein said catalyst is a tin compound or chelate.

7. The composition of claim 4, wherein said catalyst for said silane functional acrylic polymer is selected from the group consisting of a dialkyl metal diacid, dialkyl metal halide, or tetraalkyl metal, wherein said metal is tin, aluminum, titanium, or zirconium, said alkyl has 1 to 8 carbon atoms, and said acid is an organic acid having 1 to 20 carbon atoms.

8. The composition of claim 1, wherein said pigment is a metallic flake pigment.

9. A basecoat composition comprising pigment and a non-silane containing film-forming binder comprising an acrylic polyol and a melamine crosslinking agent, said basecoat composition further comprising a curing catalyst for said non-silane containing film forming binder and also at least one curing catalyst for a silane functional acrylic polymer contained in a clearcoat composition for use over the basecoat composition, which silane functional acrylic polymer is, however, not contained in the basecoat composition, and wherein said catalyst for said silane functional acrylic polymer is at least one organometallic curing catalyst which is a tin, aluminum, titanium, or zirconium chelate or compound present in the basecoat composition in the amount of from 0.1 to 5% by weight of the composition.

* * * * *